US 7,953,785 B2

(12) United States Patent
Li et al.

(10) Patent No.: US 7,953,785 B2
(45) Date of Patent: May 31, 2011

(54) CONTENT SYNCHRONIZATION IN A FILE SHARING ENVIRONMENT

(75) Inventors: Jin Li, Sammamish, WA (US); Dan Teodosiu, Kirkland, WA (US); Philip A. Chou, Bellevue, WA (US); Cheng Huang, Redmond, WA (US); Eyal Schwartz, Bellevue, WA (US); John T. Spivey, Redmond, WA (US); Yunnan Wu, Redmond, WA (US); Alexandra K. Heron, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 11/428,270

(22) Filed: Jun. 30, 2006

(65) Prior Publication Data

US 2008/0005188 A1 Jan. 3, 2008

(51) Int. Cl.
*G06F 15/16* (2006.01)
(52) U.S. Cl. ...................................... 709/201
(58) Field of Classification Search .................. 707/201; 709/201

See application file for complete search history.

(56) References Cited

U.S. PATENT DOCUMENTS

| | | | |
|---|---|---|---|
| 5,924,096 A * | 7/1999 | Draper et al. ......................... 1/1 |
| 6,721,805 B1 | 4/2004 | Bhagwat et al. |
| 6,788,688 B2 | 9/2004 | Trebes, Jr. |
| 6,954,798 B2 | 10/2005 | Eastham |
| 6,985,935 B1 | 1/2006 | Zhang et al. |
| 7,003,558 B2 | 2/2006 | Agrusa et al. |
| 7,062,555 B1 * | 6/2006 | Kouznetsov et al. ......... 709/225 |
| 7,610,387 B1 * | 10/2009 | Liskov et al. ................. 709/227 |
| 2001/0048728 A1 * | 12/2001 | Peng .............................. 375/354 |
| 2003/0050966 A1 * | 3/2003 | Dutta et al. .................... 709/203 |
| 2004/0201668 A1 * | 10/2004 | Matsubara et al. ......... 348/14.05 |
| 2005/0086369 A1 * | 4/2005 | Mai et al. ....................... 709/239 |
| 2005/0102515 A1 * | 5/2005 | Jaworski et al. .............. 713/168 |
| 2005/0108371 A1 | 5/2005 | Manion et al. |
| 2005/0135286 A1 | 6/2005 | Nurminen et al. |
| 2005/0198290 A1 * | 9/2005 | Berkey et al. ................. 709/225 |
| 2006/0013219 A1 | 1/2006 | Neilson et al. |
| 2006/0020708 A1 | 1/2006 | Hsieh et al. |
| 2006/0077952 A1 | 4/2006 | Kubsch et al. |
| 2006/0087986 A1 * | 4/2006 | Dube et al. .................... 370/255 |
| 2007/0180078 A1 * | 8/2007 | Murphy et al. ............... 709/223 |
| 2008/0318612 A1 * | 12/2008 | Axnas et al. .................. 455/522 |

OTHER PUBLICATIONS

Gummadi, et al., "Measurement, Modeling, and Analysis of a Peer-to-Peer File-Sharing Workload", SOSP '03 available from <<https://portal.acm.org/poplogin.cfm?dl=ACM&coll=portal&comp_id=945475&want_href=delivery%2Ecfm%3Fid%3D945475%26type%3Dpdf&CFID=74050241&CFTOKEN=74298378&td=1145451676121>>, Oct. 19-22, 2003, pp. 314-329.

Kleis, et al., "Hierarchical Peer-to-Peer Networks using Lightweight SuperPeer Topologies", available from <<http://www.nas.ewi.tudelft.nl/people/Xiaoming/ISCC05.pdf, pp. 1-6.

(Continued)

*Primary Examiner* — Ian N Moore
*Assistant Examiner* — Bobae K Cheney
(74) *Attorney, Agent, or Firm* — Lee & Hayes, PLLC

(57) ABSTRACT

Content synchronization in a file sharing environment is described. A node in a circle share maintains a version vector that represents that node's knowledge of file synchronization events. Version vector data may be transmitted between nodes of the circle share via a presence service in the form of short notification messages. The version vector data is compared to identify one or more nodes to be synchronized. A resource-aware overlay representing the circle share is computed, and is used to initiate communication to determine which of the available nodes with which to synchronize will provide the most synchronization value to other nodes in the circle share.

14 Claims, 8 Drawing Sheets

OTHER PUBLICATIONS

Klemm, et al., "A Special-Purpose Peer-to-Peer File Sharing System for Mobile Ad Hoc Networks", available from <<http://ieeexplore.ieee.org/iel5/9004/28571/01286080.pdf?isNumber>>, pp. 2758-2763.

Turcan, et al., "Intelligent Software Delivery Using P2P", IEEE Computer Society, Proceedings of the 2nd International Conference on Peer-to-Peer Computing, available from <<http://ieeexplore.ieee.org/iel5/8107/22420/01046323.pdf?isNumber>>, 2002, pp. 1-8.

* cited by examiner

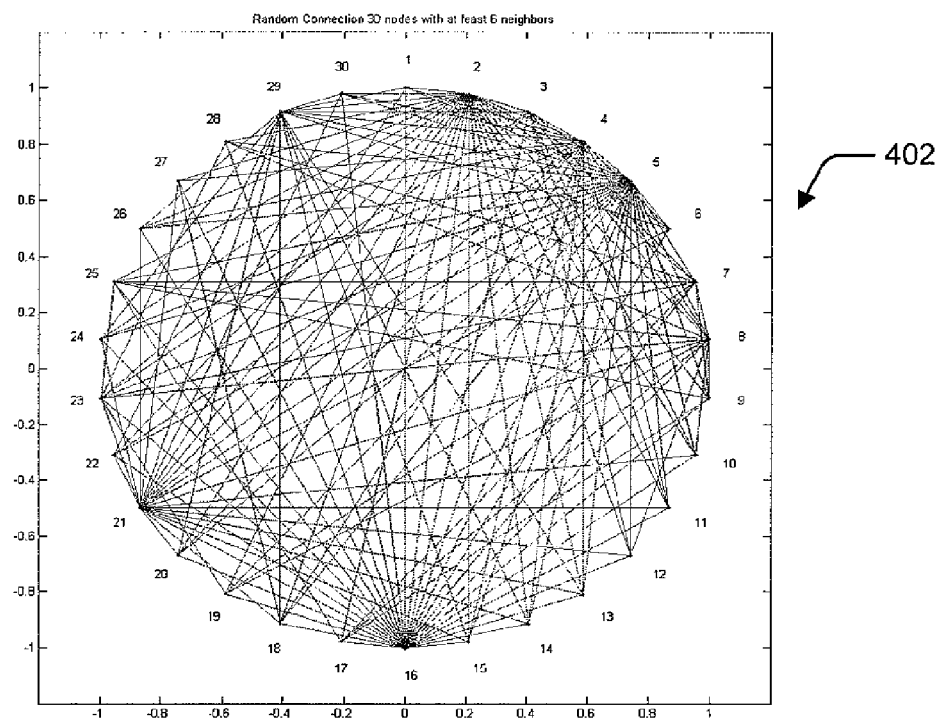
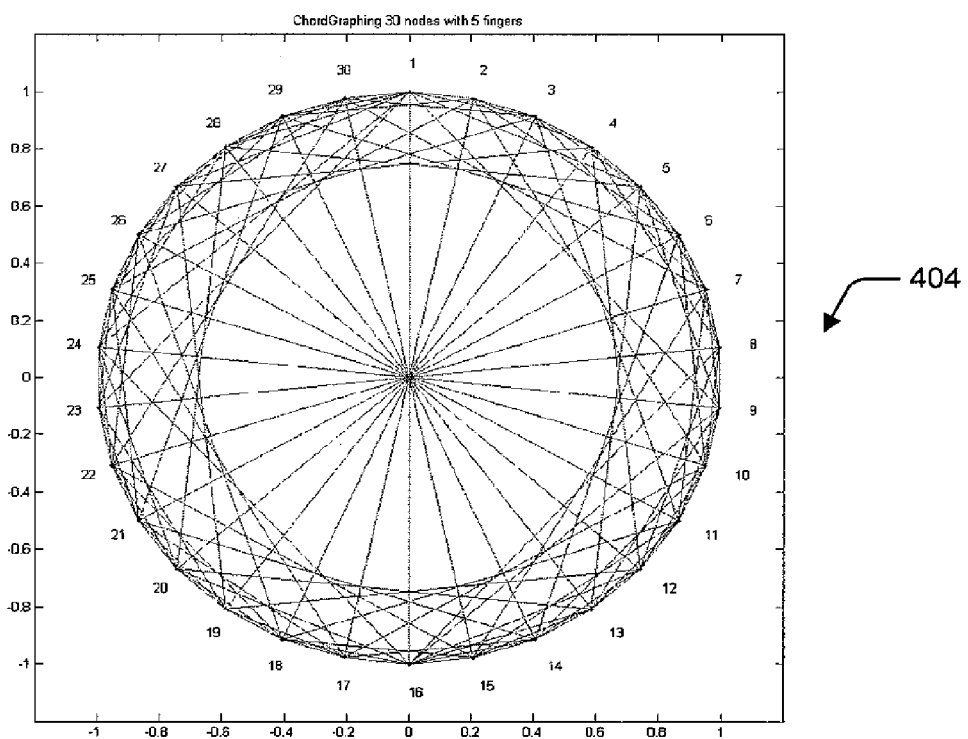
Figure 4

CONTENT SYNCHRONIZATION IN A FILE SHARING ENVIRONMENT

BACKGROUND

As the popularity of sharing files in a peer-to-peer environment grows, so too does the challenge of providing group sharing environments that enable users to share files in an efficient manner in environments with large numbers of users and sharing relationships.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for content synchronization in a file sharing environment are described. File synchronization events are distributed to members of a group sharing a set of files to ensure that the shared files remain synchronized between the members of the group (also referred to as a circle share). Each node of the circle share maintains a version vector summarizing that node's awareness of file synchronization events. Version vector data can be transmitted via short notification messages between members of the circle share without requiring fill connections between the members. The version vector data is used to determine nodes to be synchronized and file synchronization events to be exchanged. A resource-aware overlay graph is computed to determine which of a plurality of nodes with which to synchronize will most likely further efficient synchronization of other nodes in the circle share.

BRIEF DESCRIPTION OF THE DRAWINGS

FIG. 4 illustrates graph representations of two exemplary types of overlays that may be used to represent relationships between nodes of a circle share.

DETAILED DESCRIPTION

The embodiments described below provide techniques for content synchronization in a file sharing environment. Version vectors are implemented to keep track of file synchronization events at nodes within a peer-to-peer environment and are used to identify differences between nodes to be synchronized. An overlay graph representing peer-to-peer connections within the environment can be utilized to select preferred synchronization partners.

Figure 1:
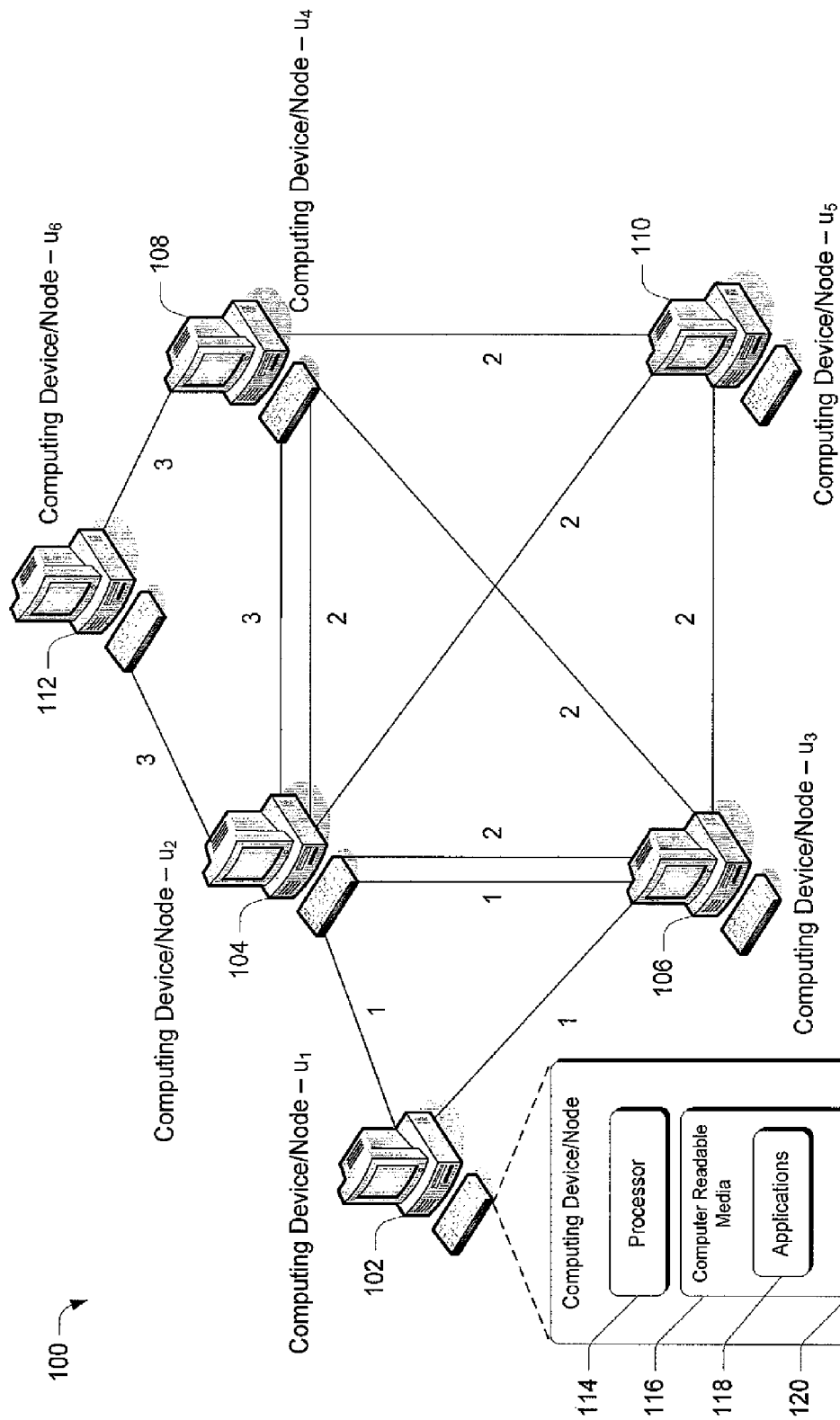
FIG. 1 is a pictorial diagram that illustrates an exemplary peer-to-peer file sharing environment.

FIG. 1 illustrates an exemplary peer-to-peer sharing environment 100. It is to be appreciated and understood that this exemplary file-sharing environment constitutes but one example of an environment in which the techniques described herein can be implemented. It is to be appreciated and understood that other environments can be utilized without departing from the spirit and scope of the claimed subject matter FIG. 1 illustrates a number of devices or nodes 102, 104, 106, 108, 110, and 112. Each node is associated with a particular user so, for example, node 102 is associated with user 1 or $u_1$, node 104 is associated with user 2 or $u_2$, and so on. Each device typically includes one or more processors 114 and one or more computer-readable media 116 on which reside one or more different applications 118 which are executable by processor 114. In this particular example, a synchronization negotiation manager 120 is provided in the form of computer-readable instructions that reside on the computer-readable media and are executable by processor 114. The synchronization negotiation manager 120 can comprise part of an application 118, or it can reside in the form of a standalone component.

As illustrated in FIG. 1, the sharing relationships within the peer-to-peer sharing environment 100 can be categorized as a multigraph in which there can be multiple sharing relationships between any two nodes. More specifically, one or more groups, each known as a circle share, can be defined within environment 100 such that each node within a circle share has a sharing relationship with each other node within the circle share. In the illustrated example, individual circle shares or groups are designated by a line extending between individual nodes in the group and having a numerical designation. Thus, a first circle share or group (having "1" as a designator) is comprised of nodes 102, 104, and 106; a second circle share or group (having "2" as a designator) is comprised of nodes 104, 106, 108, and 110; and a third circle share or group (having "3" as a designator) is comprised of nodes 104, 108, and 112. In this example, a circle share or group might be labeled by a more user-friendly name, such as "My Soccer Team", "Dog Lovers of Seattle", "My Family" and the like.

When a user shares a file with a group, the file, as well as any subsequent file modifications by any member of the group, may be distributed to each member of the group. Given the nature of the circle share and the realization that a large number of users can belong to a particular circle share, as well as the realization that each user can belong to any number of circle shares, efficient synchronization of file sharing activities can be particularly challenging.

The peer-to-peer file sharing environment (e.g., which may be implemented as an instant messaging system) utilizes the notion of presence. Presence essentially refers to knowledge of when a person or "buddy" is online. In other words, when a first user is online and a second user comes online, if the users are "buddies", then a presence service automatically notifies each of the users that the other user is online.

Typically, presence, as well as network connection and device characteristics, can be maintained by a server because this type of information tends to change relatively infrequently. The information that pertains to whether users should synchronize shared files, however, may change relatively frequently. Accordingly, it may be more efficient from the server's standpoint to have this information maintained by the individual devices or nodes. In an exemplary embodiment, the presence service may be implemented by a centralized server or set of servers. In an alternate embodiment, the presence service may be implemented using a peer-to-peer approach.

Figure 2:
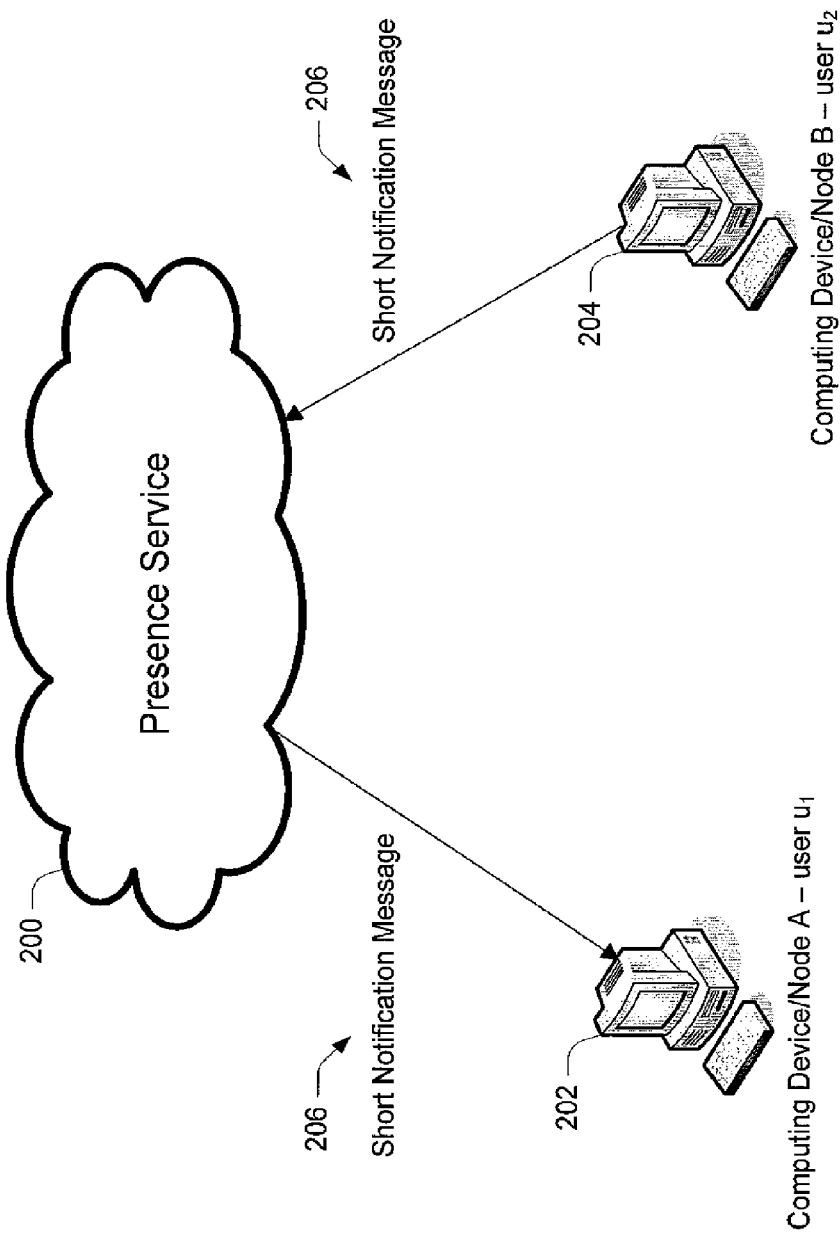
FIG. 2 is a pictorial diagram that illustrates an exemplary sharing relationship between two users in a presence-based peer-to-peer network.

FIG. 2 illustrates an exemplary sharing relationship between users of two nodes—node A 202 (user $u_1$) and node B 204 (user $u_2$). For example, assume that user $u_1$ is online and user $u_2$ logs in. When user $u_2$ logs in, presence information is sent to user $u_1$ by the presence service 200. At this point, nodes 202 and 204 can exchange information to determine whether synchronization between the two nodes is warranted. In an exemplary implementation, information exchange between nodes 202 and 204 takes place via a short notification message 206, which is a relatively lightweight, non-bandwidth-intensive communication between the nodes. The short notification message 206 is transmitted through presence service 200, and therefore does not require a full direct peer-to-peer connection (e.g., a transmission control protocol (TCP) connection, a user datagram protocol (UDP) connection, an hypertext transfer protocol (HTTP) connection, and so on) between the two nodes. In an exemplary implementation, a short notification message can either represent an invitation to connect and synchronize (which may be denoted an "SNM"), or a negative acknowledgement, or refusal, to establish a connection and synchronize at this point in time (which may be denoted as "NAK"). Although FIG. 2 only depicts one direction for the short notification message 206, short notification messages can be sent by either node, and thus in either direction.

As an example, assume that two users have a sharing relationship based on their respective membership in the same circle share, and assume that a first user (e.g., node A) is currently online. When a second user (e.g., node B) comes online, as part of the notion of presence, data is sent through a presence service to the first user's computing device (e.g., node A) to indicate that the second user is online. Other information may also be sent that pertains, for example to the type of network connection that the second user has, the type of device that the second user is using, and information that can be utilized to ascertain whether synchronization of shared files between the two users is warranted.

Figure 3:
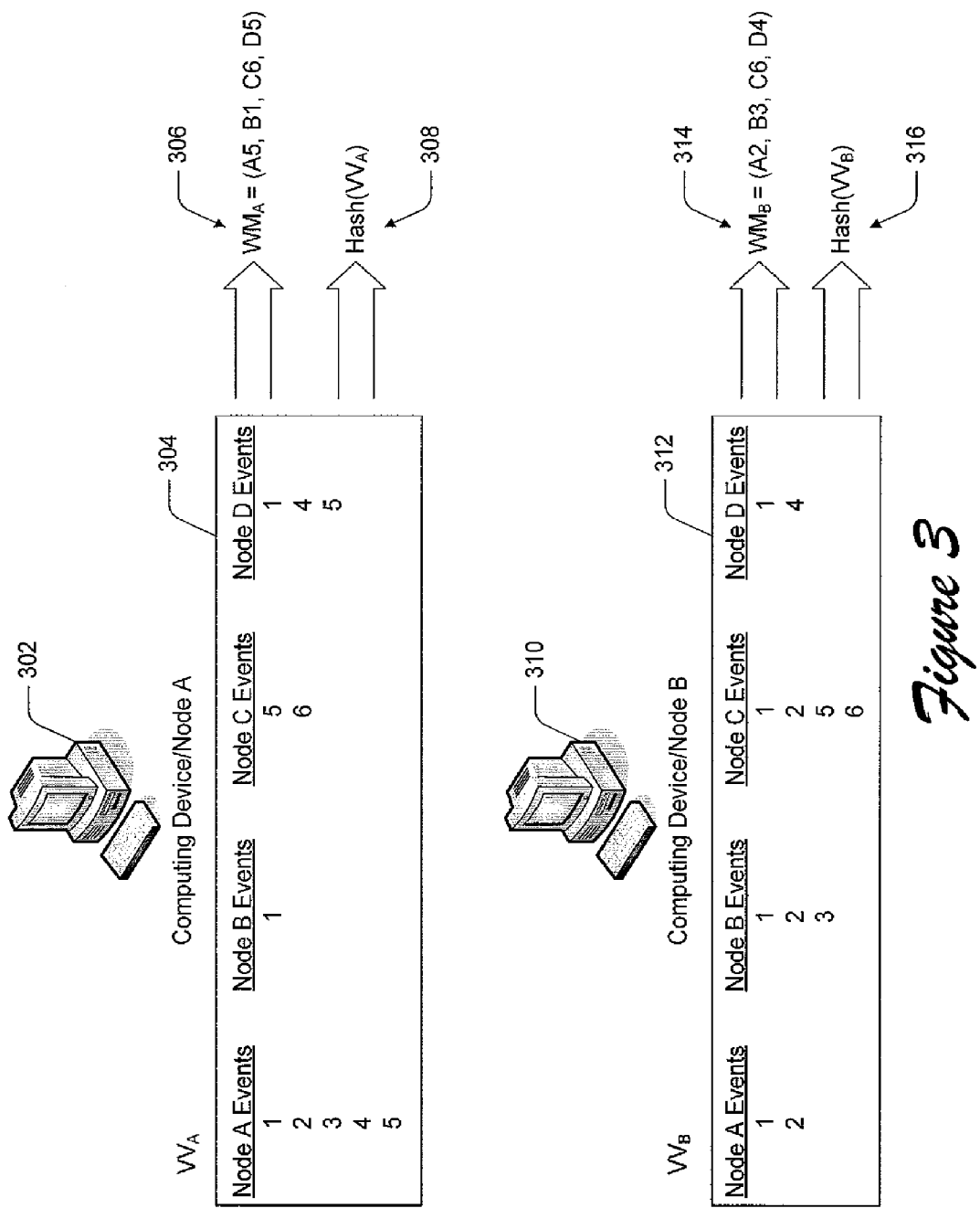
FIG. 3 is a pictorial diagram that illustrates an exemplary mechanism for maintaining version vector data at a node within a circle share.

FIG. 3 illustrates an exemplary mechanism for maintaining data at a node that can be used to determine when and what file synchronizations are to be performed. FIG. 3 illustrates data maintained by two exemplary nodes (node A and node B) within an exemplary circle share consisting of four nodes (node A, node B, node C, and node D). Node A 302 maintains a version vector 304, which represents the file synchronization events (also known in the literature as "version numbers"), of which node A is aware. This version vector may be denoted as "$VV_A$". File synchronization events may correspond to, for example, a new file being shared, deletion of a shared file, and/or modification of a shared file. Assuming that a file synchronization event is given an identifier (ID) by the node that initiates the file synchronization event, $VV_A$ indicates that node A is aware of five file synchronization events initiated at node A (i.e., events A1, A2, A3, A4, and A5), one file synchronization event initiated at node B (i.e., event B1), two file synchronization events initiated at node C (i.e., events C5 and C6), and three file synchronization events initiated at node D (i.e., events D1, D4, and D5). When two nodes synchronize with one another, the version vectors maintained by those nodes are updated to reflect file synchronization events that the respective nodes have become aware of by virtue of the synchronization.

As illustrated in FIG. 3, node A may also generate a high watermark 306 of $VV_A$. The high watermark of $VV_A$ may be denoted "$WM_A$", and indicates the most recent file event (e.g., the file event having the highest ID value) initiated by each node of which node A is aware. For example, as illustrated in FIG. 3, the most recent events of which node A is aware are: event 5 initiated at node A, event 1 initiated at node B, event 6 initiated at node C, and event 5 initiated at node D. Accordingly, $WM_A$ includes representations of events A5, B1, C6, and D5. In an exemplary implementation, a hash 308 of the $VV_A$ may also be generated. Hash 308 is a condensed representation of $VV_A$, and may be compared to hashed version vectors of other nodes to determine if the version vectors are exactly the same.

FIG. 3 also illustrates a second node, node B 310, and a version vector ($VV_B$) 312, representing the file synchronization events, of which, node B 310 is aware. As described above with reference to node A 302, a high water mark ($WM_B$) 314 and a hash 316 may also be generated based on $VV_B$.

A comparison between $WM_A$ and $WM_B$ indicates that there are at least three file events that initiated at node A of which node B is not aware (i.e., events A3, A4, and A5); there are at least two file events that initiated at node B of which node A is not aware (i.e., events B2 and B3); and there is at least one file event of which node A is aware that initiated at node D and of which node B is not aware (i.e., event D5). If two nodes have identical high watermark values, a comparison of the hashed version vectors may be made to determine whether or not synchronization between the two nodes is warranted (i.e., whether or not "holes" in the file synchronization events below the high watermarks of the two peers are exactly the same).

An overlay structure is a dynamic subgraph that may be used to represent existing and/or potential communications within a circle share. FIG. 4 illustrates graph representations of two exemplary types of overlays that may be used to represent relationships between nodes of a circle share. Random overlay 402 is an example of an unstructured overlay. In an example unstructured overlay, each node is assigned a minimum and a maximum number of partners. Whenever the number of partners for a particular node falls below the minimum number, the node connects to another partner. Similarly, requests to connect to other partners will be accepted as long as the current number of partners for the node is less than the assigned maximum number of partners.

Distributed hash table (DHT) overlay 404 is an example of a structured overlay that provides an alternate representation of relationships between nodes of a circle share. As illustrated in FIG. 4, the DHT overlay 404 is an example of a chord graph of 30 nodes with five fingers each. It should be apparent that a variety of other techniques may also be used, which employ structured overlays to represent potential and/or existing connections within a circle share.

Figure 5:
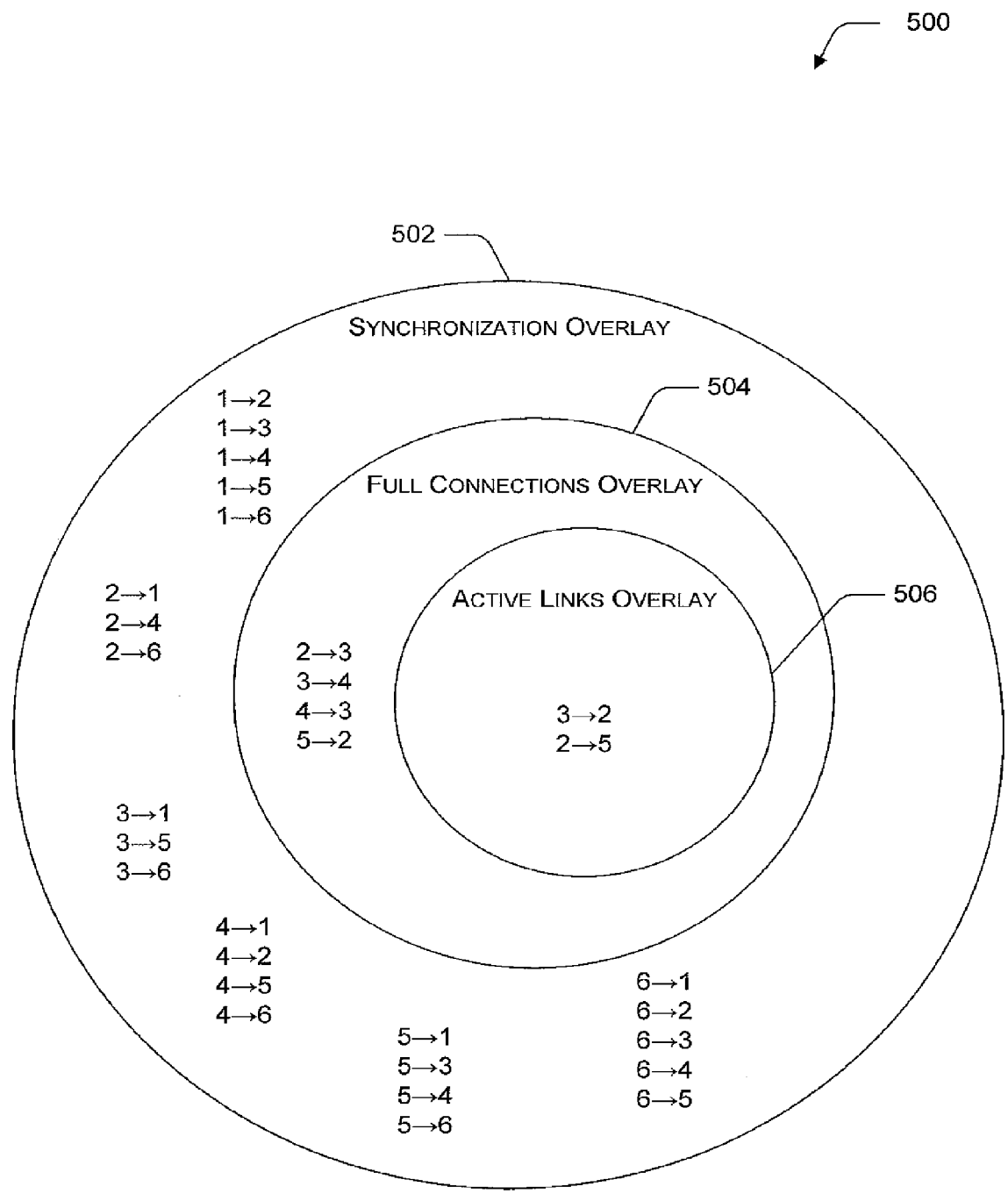
FIG. 5 is a block diagram that illustrates an exemplary hierarchical overlay structure that can be used to describe the connections within a particular circle share at a particular point in time.

FIG. 5 illustrates an exemplary hierarchical overlay structure 500 that can be used to describe the connections within a particular circle share at a particular point in time. Overlay structure 500 represents communication links between members of an exemplary circle share having six nodes. The notation used in FIG. 5 is such that "A→B" represents a connection in which data is transmitted, or synchronized, from node A to node B. Synchronization overlay 502 includes a representation of possible synchronization relationships within the circle share. Full connections overlay 504 is a subset of synchronization overlay 502, and includes a representation of existing full connections between nodes in the circle share (e.g., nodes with an existing TCP, UDP, HTTP, or other such connection between them). Active links overlay 506 is a subset of full connections overlay 504, and includes a representation of connections between nodes in the circle share in which data is currently being transmitted for the purpose of synchronization.

In an exemplary implementation, each node uses the cached version vectors of its partner peers to determine whether it is warranted to update a certain partner peer with its most recent version vector. For example, if there is a link from node B to node A, "B→A", in the synchronization overlay 502, the link signifies that node B is responsible for informing node A of any updates to the version vector of node B. Node B caches the most recently received representation of node A's version vector, which may be summarized as a combination of the high watermark and/or hash of node A's version vector. At any moment, if B's current version vector is the same as the cached version vector of node A (which may be determined by comparing the hashes), there is no need to establish a connection between nodes A and B. However, when node B's current version vector is different from the cached version vector of node A, node B will update node A with node B's current version vector, and seek to establish a connection to node A.

In an exemplary implementation, when node B updates node A with its current version vector, node B sends the high watermark ($WM_B$) and hash maintained by node B to node A. This enables node A to compare its high watermark ($WM_A$) and hash with node B's high watermark and hash to determine whether or not synchronization of the two nodes is warranted. In an exemplary implementation, by sending the high water mark and the hashed version vector via a short notification message, establishment of a heavyweight connection (e.g., a TCP connection, an HTTP connection, a UDP connection, and the like) between the two nodes may be avoided unless and until it is determined that a synchronization between the two nodes is warranted.

In an exemplary implementation, each node of a circle share generates a dynamic overlay structure that represents the current connections between nodes of the circle share. As described above, along with presence data, node characteristics (e.g., upload bandwidth, download bandwidth, network proximity, connection type, etc.) are also transmitted via short notification messages when a node comes online. While the version vector data can be used to determine which nodes may synchronize with one another, the dynamic overlay structure and the node characteristics data can be used to determine which nodes should synchronize first, in order to efficiently distribute file synchronization events to all members of the circle share.

Figure 6:
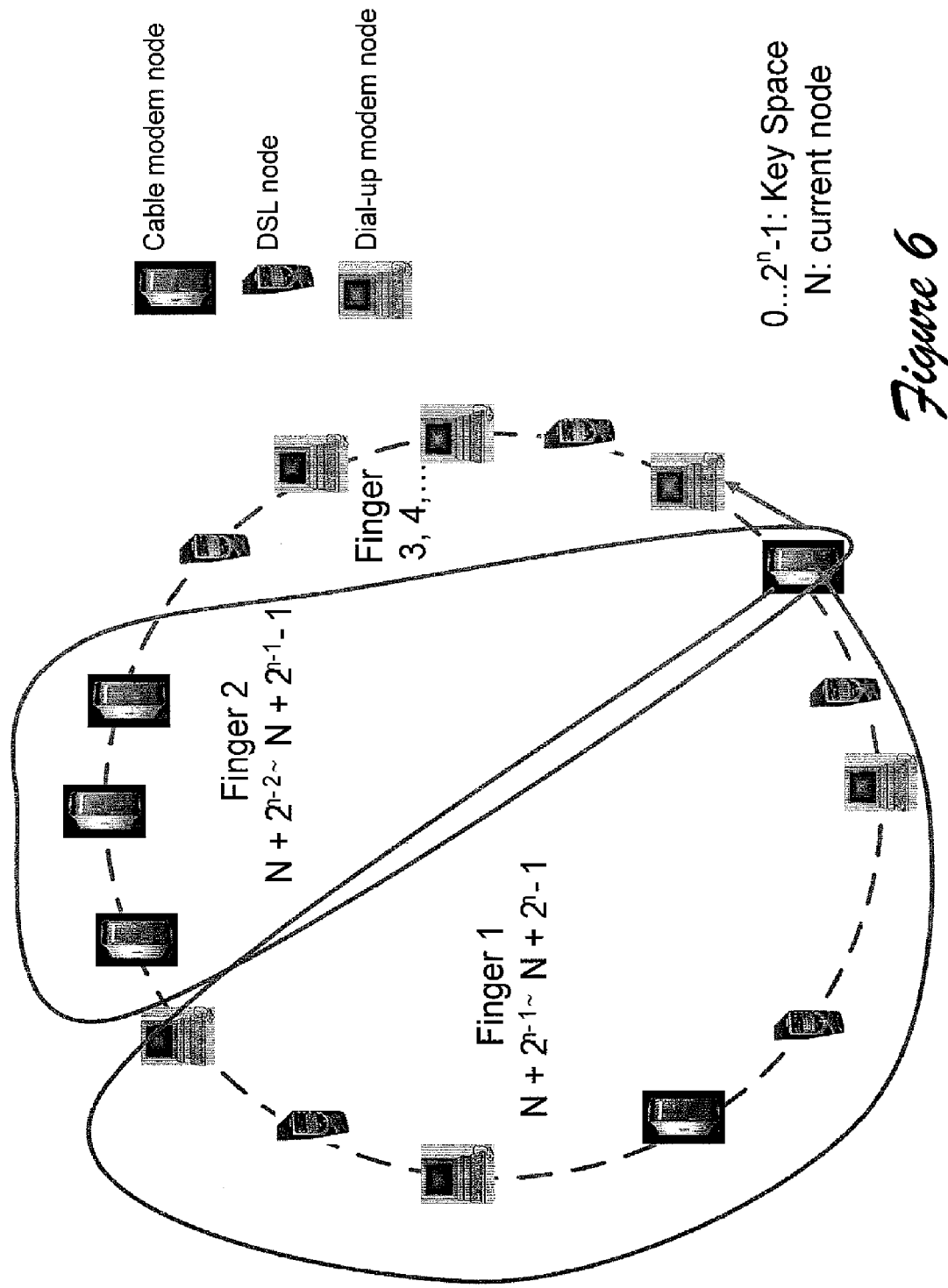
FIG. 6 is a pictorial diagram that illustrates an exemplary resource-aware chord-like approach to an overlay graph for a circle share.

FIG. 6 illustrates an exemplary resource-aware chord-like approach to an overlay graph for a circle share. In the illustrated example, $0 \ldots 2^n-1$ represents a key space and N represents the current node. For each node N, n fingers are identified, where each finger includes a node associated with N in the overlay graph. Each of the n fingers is identified so that it includes a node in a calculated finger range. Synchronization partners for the current node are selected such that, at most, one partner is selected from each finger range. Furthermore, within each finger range, a partner is selected based, at least in part, on a comparison of characteristics of the potential partner nodes, such as connection type (e.g., cable modem, digital subscriber line (DSL) connection, dial-up modem, etc.), upload bandwidth, download bandwidth, proximity, roundtrip data transmission time, and so on. This characteristic-based selection is implemented to improve the efficiency with which data is synchronized among members of the circle share.

Accordingly, when a node comes online, generation of an overlay graph may include determining one or more finger ranges and determining which node within each finger range to select. The techniques illustrated and described herein are merely examples, and it is to be appreciated that any number of techniques may be used to generate an overlay graph, to determine finger ranges, and/or to select nodes within the determined finger ranges.

In an exemplary implementation, node selection for synchronization is based on two goals—first, a given node desires to pull data from the node that will give the most utility per second; and second, a given node desires to push data to the node that can derive the most utility per second. The utility per second of a receiving node may be based on any combination of the immediate appreciation of the data at the node; the node's capacity to upload the data to other nodes; and the node's upload link speed. As an example, a node with a DSL connection would be preferred over a node with a dial-up connection based on both the node's upload link speed and the node's capacity to upload the data to other nodes.

Any number of factors may be used to determine a particular node's utility with respect to synchronization in comparison to the utility of another node. For example, one factor may be a particular node's ability to redistribute file synchronization events once synchronized. In other words, a node with a faster connection and/or more available upload bandwidth would be more desirable than a node with a slower connection and/or less available upload bandwidth. A second factor may be a node's current synchronization status. For example, if a node is currently synchronized with the other available nodes, then that node has nothing to offer the other nodes in the way of synchronization. Sending new file synchronization events to that node will increase that node's utility, making it no longer synchronized with the other nodes, and able to redistribute those new file synchronization events. Another factor may be the rareness of the file synchronization event to be sent. For example, sending a file synchronization event that has already been sent to most members of the circle share may be considered less urgent than sending a newer file synchronization event of which fewer members of the circle share are currently aware. Yet another factor may be the intrinsic value of a file synchronization event to a receiving node. For example, a user at the receiving node may be more interested in synchronizing files originating from one node than from another node. Accordingly, by selecting synchronization partners based on node characteristics and version vector data transmitted along with the presence data, in conjunction with a structured overlay graph representing the circle share, efficient distribution of file synchronization events can be achieved.

Figure 7:
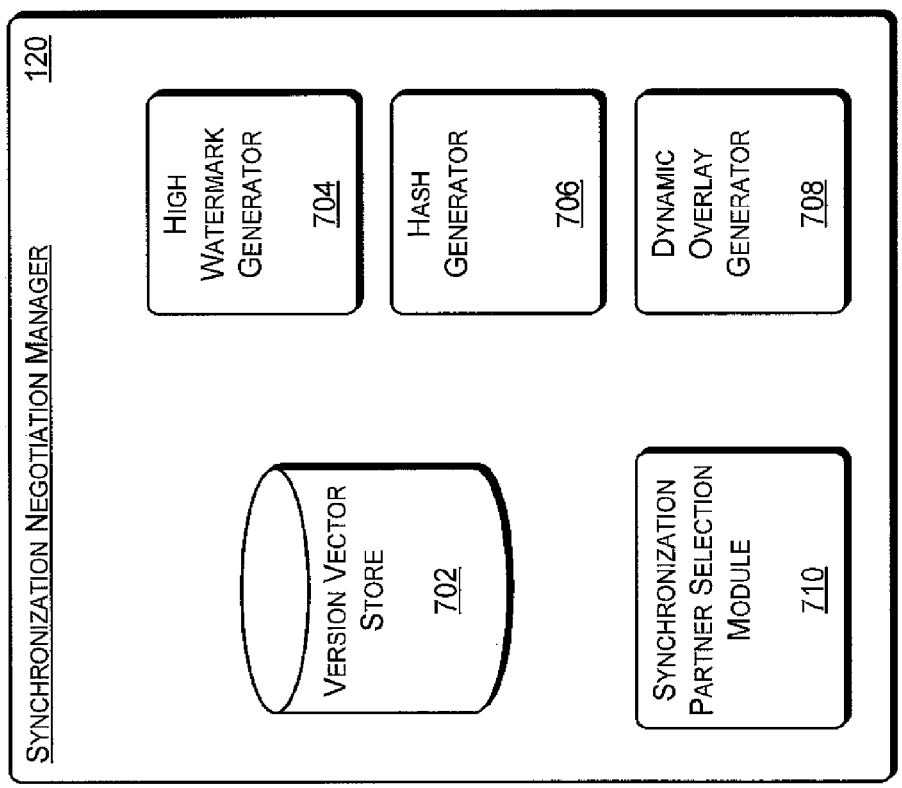
FIG. 7 is a block diagram that illustrates select components of an exemplary synchronization negotiation manager.

FIG. 7 illustrates select components of an exemplary synchronization negotiation manager 120. Synchronization negotiation manager 120 includes version vector store 702, high watermark generator 704, hash generator 706, dynamic overlay generator 708, and synchronization partner selection module 710.

Version vector store 702 is configured to maintain records of file synchronization events associated with shared files. In an exemplary implementation, version vector store 702 maintains file synchronization events initiated by the local node as well as file synchronization events initiated by other nodes in the circle share.

High watermark generator 704 is configured to extract data from version vector store 702 to generate a high watermark of the current node's version vector as described above with reference to FIG. 3. Similarly, hash generator 706 is configured to generate a hash of the current node's version vector as described above with reference to FIG. 3.

Dynamic overlay generator 708 is configured to generate a dynamic overlay that represents a potential set of connections (or synchronization overlay 502) within the circle share. Example synchronization overlays are described above with reference to FIGS. 4-6.

Synchronization partner selection module 710 is configured to compare version vector data (e.g., high watermarks and/or hashed version vectors) and node characteristic data associated with multiple nodes, and analyze the dynamic overlay generated by dynamic overlay generator 708 to select a node with which to synchronize to efficiently distribute file synchronization events throughout the circle share.

Methods for implementing content synchronization in a file sharing environment may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 8:
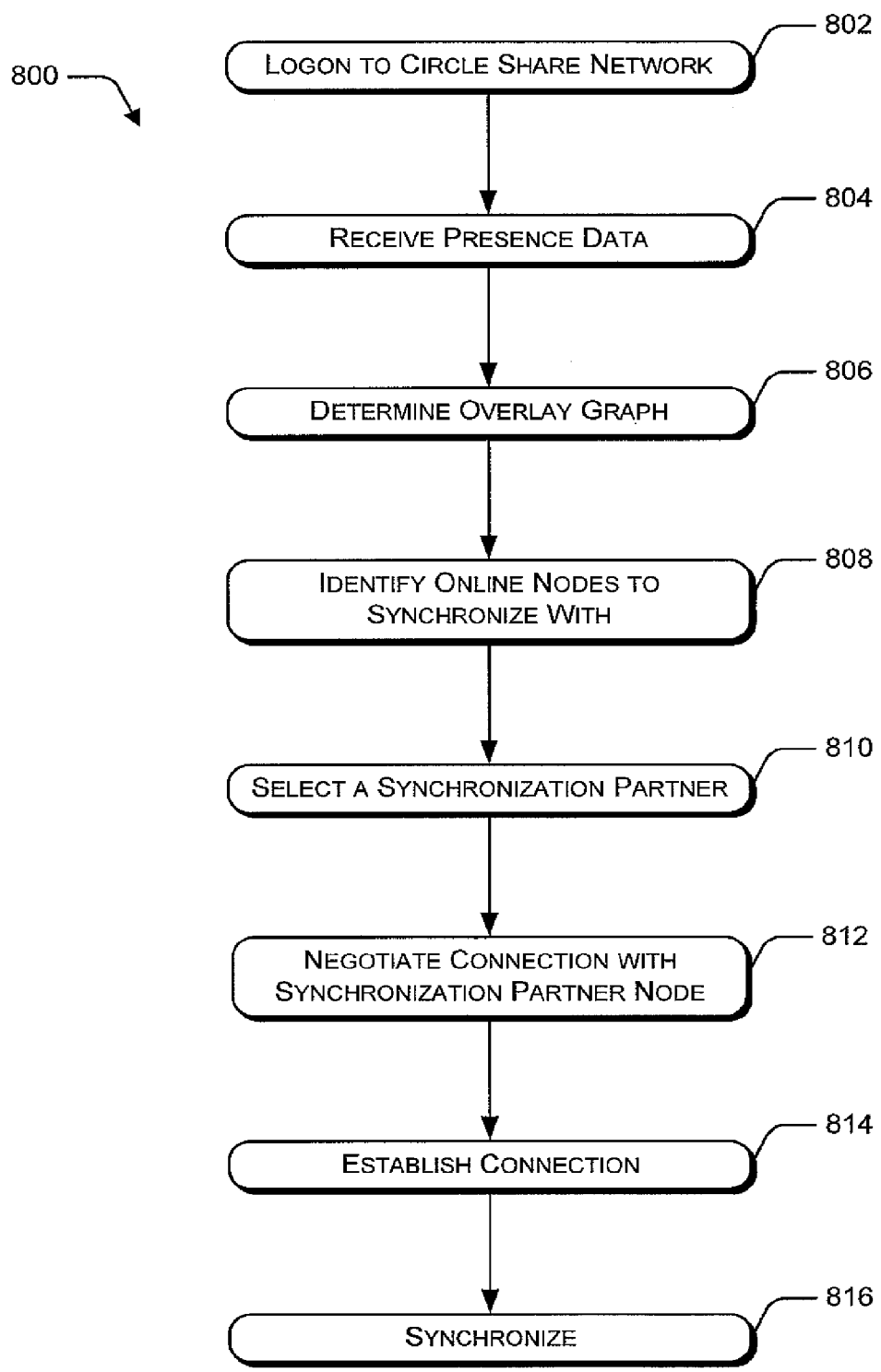
FIG. 8 is a flow diagram that illustrates an exemplary method for content synchronization in a file sharing environment.

FIG. 8 illustrates an exemplary method for content synchronization in a file sharing environment. FIG. 8 is a specific example of content synchronization in a peer-to-peer file sharing environment, and is not to be construed as a limitation. The order in which the method blocks are described is not intended to be construed as a limitation, and any number of the described method blocks can be combined in any order to implement the method. Furthermore, the method can be implemented in any suitable hardware, software, firmware, or combination thereof.

FIG. 8 illustrates an exemplary method 800 for content synchronization in a peer-to-peer file sharing environment. At block 802, a node connects to a circle share network. For example, a user logs on to an instant messaging or other type of peer-to-peer network in which the user has an established file sharing relationship with two or more other users.

At block 804, presence data is received. For example, data indicating which nodes are online is transmitted through presence service 200 to the nodes of the circle share that are online. The presence data is received by both the node connecting to the network (informing it about the other nodes that are already connected), as well as the other connected nodes (informing them of the newly connected node).

At block 806, an overlay graph is determined. For example, dynamic overlay generator 708 determines a structured overlay graph based, at least in part, on the received presence data. In an exemplary implementation, the overlay graph is calculated by each of the connected nodes independently; since each node receives the same presence data and uses the same algorithm, each node will calculate the same overlay graph. In an alternate embodiment, the overlay graph can be calculated by the presence service 200 and communicated to each of the connected nodes.

At block 808, one or more online nodes with which synchronization is warranted are identified. For example, version vector summary data is exchanged with the nodes that are currently online via short notification messages.

In an alternate implementation, each node maintains its own version vector as well as a cached version vector for each other node with which it has previously synchronized. In such an implementation, version vector data is exchanged if a particular node identifies differences between its version vector and a cached version of another node's version vector which is a peer in the dynamic overlay graph.

At block 810, a synchronization partner is selected. For example, synchronization partner selection module 710 analyzes the version vector data to identify with which nodes synchronization is warranted. The dynamic overlay graph is then analyzed in light of the version vector data and any available node characteristic data to identify one or more synchronization partners that will likely lead to efficient distribution of shared file events. As described above, selection of a synchronization partner may be based on any number and combination of factors, which may include but are not limited to, a node's anticipated ability to redistribute file events and a degree to which a particular file event has already been synchronized within the circle share.

At block 812 a connection with the selected synchronization partner node is negotiated. For example, an SNM requesting a connection may be transmitted via the presence service to the selected synchronization partner node. In an exemplary implementation, a token is sent along with the SNM, and may be passed back and forth between the two nodes until a time at which both nodes are available to establish the connection.

At block 814 a full connection is established with the selected partner node. For example, an HTTP connection, UDP connection, TCP connection, or the like is established between the two nodes.

At block 816, the two nodes are synchronized via the established peer-to-peer connection. For example, the full version vectors of the two nodes may be exchanged, enabling each node to request and apply the file changes indicated by the exchanged file synchronization events.

As long as there are nodes within the circle share that are not fully synchronized, the method illustrated in FIG. 8 may continue.

Although embodiments of content synchronization in a file sharing environment have been described in language specific to structural features and/or methods, it is to be understood that the subject of the appended claims is not necessarily limited to the specific features or methods described. Rather, the specific features and methods are disclosed as exemplary implementations of content synchronization in a file sharing environment.

The invention claimed is:

1. A method, implemented at least in part by a computer, comprising:
   determining an overlay graph representation of connections between a plurality of nodes within a peer-to-peer file sharing network; and
   selecting first and second nodes to be synchronized via the peer-to-peer file sharing network, wherein the first and second nodes are selected from the plurality of nodes based at least in part on the overlay graph, wherein selecting the first and second nodes to be synchronized further comprises:
   maintaining at the first node, a plurality of version vectors, each version vector being associated with one of the plurality of nodes and each version vector representing a list of events that have been applied to files maintained by its associated one of the plurality of nodes, the plurality of nodes including the first and second nodes and at least one additional node; and
   when a comparison of the first and second version vectors indicates that synchronization between the first and second nodes is warranted,
   transmitting to the second node a high watermark generated based on the maintained plurality of version vectors, the high watermark including a most recent event, for each of the plurality of nodes, of which the first node is aware to enable the second node to determine that synchronization is warranted, and transmitting a form of the first version vector from the first node to the second node to be utilized by the second node to determine, when the transmitted high watermark matches a high watermark of the second node, whether there are events in the first version vector other than the most recent event in the first version vector of which the second node is unaware, wherein the second node is selected based at least in part on an anticipated utility of the synchronization, and the anticipated utility of the synchronization is based at least in part on an anticipated ability of the second node to redistribute file events that will be transmitted to the second node from the first node via the synchronization.

2. The method as recited in claim 1, wherein the anticipated ability of the second node to redistribute file events is based on at least one of an upload bandwidth associated with the second node or a connection type associated with the second node.

3. The method as recited in claim 1, wherein the overlay graph comprises at least one of a structured overlay graph or a distributed hash table (DHT) overlay graph.

4. The method as recited in claim 1, wherein the overlay graph representation is determined based, at least in part, on a resource associated with one of the plurality of nodes.

5. The method as recited in claim 4, wherein the resource comprises at least one of a network proximity, a download bandwidth, an upload bandwidth, a network connection type, or a network connection speed.

6. The method as recited in claim 1, wherein the events that have been applied to files comprise at least one of creation of a new file, deletion of a shared file, or a modification to a shared file.

7. The method as recited in claim 1, wherein the form of the first version vector is transmitted via a presence service as a short notification message.

8. The method as recited in claim 7, wherein the presence service is configured to automatically notify the second node when the first node logs on to the peer-to-peer network.

9. The method as recited in claim 1, wherein the form of the first version vector that is transmitted comprises a hash of a collection of file events.

10. The method as recited in claim 1, further comprising:
maintaining at the second node, a third version vector representing events that have been applied to files maintained by the second node; and
when a comparison of the transmitted form of the first version vector and a form of the third version vector indicates that synchronization between the first and second nodes is warranted, synchronizing the first and second nodes via a direct peer-to-peer connection between the first and second nodes.

11. The method as recited in claim 1, further comprising:
maintaining at the second node, the high watermark of the second node; and
when a comparison of the transmitted high watermark and the high watermark of the second node indicates that synchronization between the first and second nodes is warranted, synchronizing the first and second nodes via a direct peer-to-peer connection between the first and second nodes.

12. The method as recited in claim 1, wherein the determining the overlay graph representation is based, at least in part, on at least one of: a sharing relationship between individual ones of the plurality of nodes, a presence status associated with at least one of the plurality of nodes, or a published capability associated with at least one of the plurality of nodes.

13. A synchronization negotiation manager comprising:
a processor; and
a plurality of executable instructions configured to be operated by the processor to implement:
a version vector store configured to maintain version vectors that are each particular to one of a plurality of nodes and that each identify shared file events that have been applied to files maintained by the one of the nodes to which the version vector is particular, the version vector store maintaining a plurality of version vectors for a plurality of nodes of a group defined within a peer-to-peer network;
a dynamic overlay generator configured to generate an overlay that represents connections between one or more of the plurality of nodes and resources of the one or more of the plurality of nodes;
a synchronization partner selection module configured to analyze the version vectors and the overlay to select a synchronization partner, wherein the synchronization partner is selected based at least in part on an anticipated utility of synchronization, and the anticipated utility of the synchronization is based at least in part on an anticipated ability of the synchronization partner to redistribute file events that will be transmitted to the synchronization partner via the synchronization;
a hash generator configured to generate a hash of one of the version vectors; and
a high watermark generator configured to generate a high watermark based on the maintained plurality of version vectors, such that the high watermark indicates, for each node of the plurality of nodes, including a node other than the synchronization partner, a most recent event of which the synchronization negotiation manager is aware,
wherein the hash of the one of the version vectors is utilized to determine whether synchronization is warranted when the high watermark matches a high watermark of the synchronization partner.

14. One or more tangible computer-readable storage device comprising computer-executable instructions that, when executed, cause a computing system to:
receive at a first node of a peer-to-peer group of a plurality of nodes, presence-based data indicating that second and third nodes of the peer-to-peer group are online;
receive at the first node, version vector data respectively associated with the second and third nodes, the version vector data representing one or more file synchronization events that are respectively available from the second and third nodes, each of the second and third nodes maintaining first and second version vectors representing events associated with files shared by the peer-to-peer group, wherein the first version vector represents events that have been applied to files maintained by the second/third node and the second version vector represents events that have been applied to files maintained by the first node, wherein the version vector data corresponds to the first version vector of each of the second and third node and is transmitted to the first node when a comparison of the first and second version vectors indicates that synchronization between the first and second/third nodes is warranted;

receive at the first node a high watermark from one of the second and third nodes, the high watermark indicating, for the first, second, third, and at least one additional node, a most recent event of which the second/third node is aware;

compare the received high watermark to a high watermark of the first node to determine whether synchronization between the first and second nodes is warranted and whether synchronization between the first and third nodes is warranted;

in the event that the high watermarks match, compare the version vector data associated with the second and third nodes with version vector data associated with the first node to determine whether there are events in the version vector data associated with the second and third nodes of which the first node is unaware in order to further determine whether synchronization between the first and second/third nodes is warranted;

generate a resource-aware overlay representing characteristics of and connections between nodes of the peer-to-peer group; and when synchronization between the first and second nodes and the first and third nodes is warranted, analyze the resource-aware overlay to select either the second or third node for synchronization, wherein the second or third node is selected based at least in part on an anticipated utility of the synchronization, and the anticipated utility of the synchronization is based at least in part on an anticipated ability of the second or third node to redistribute file events that will be transmitted to the second or third node from the first node via the synchronization.

* * * * *